(No Model.)

E. K. HAYNES.
FILTER.

No. 276,179. Patented Apr. 24, 1883.

WITNESSES
Fred A. Powell
A. O. Orne

INVENTOR
Edgar K. Haynes
by Crosby & Gregory
Attys.

UNITED STATES PATENT OFFICE.

EDGAR K. HAYNES, OF BOSTON, MASSACHUSETTS, ASSIGNOR OF ONE-HALF TO GEORGE W. GREGORY, OF SAME PLACE.

FILTER.

SPECIFICATION forming part of Letters Patent No. 276,179, dated April 24, 1883.

Application filed January 22, 1883. (No model.)

*To all whom it may concern:*

Be it known that I, EDGAR K. HAYNES, of Boston, county of Suffolk, State of Massachusetts, have invented an Improvement in Filters, of which the following description, in connection with the accompanying drawings, is a specification, like letters on the drawings representing like parts.

My invention, relating to filters, has for its object to produce a more durable and effective filter than those heretofore in use, and one which is of simple and inexpensive construction.

The filter consists essentially of a case or shell, preferably cylindrical in shape, provided at either end with heads, and thus forming a receptacle for the usual filtering material. The said heads are provided with a series of openings near their periphery for the passage of the liquid to be filtered, the said opening being covered with the usual foraminous plates, which serve to partially strain the liquid and also to retain the charcoal or filtering material in its receptacle. The heads are provided with depressions or cavities at their middle. The said receptacle is provided with bonnets at either end, adapted to be connected with the pipe or faucet from which the liquid to be filtered is drawn, the said bonnets inclosing chambers at either end of the receptacle, and have passages for the inlet and outlet of the liquid, which open into the said cavities of the heads. The filter is alike at both ends, either of which may be connected with the pipe or faucet from which the liquid is drawn. The liquid in entering the passage through the bonnet passes into the cavity of the adjacent head, from which it spreads over the entire head and passes through the openings around the periphery and through the filtering material. The liquid is thus spread out through the entire mass of the filtering material, which it traverses with a comparatively slow movement without boring channels therethrough, as generally happens when the liquid passes directly through the middle of the filtering material in filters of common construction. The liquid issuing from the filtering-receptacle passes up into the cavity at the middle of the head and then out through the passage in the bonnet, the said cavity and passage constituting a trap by which the interior of the filtering-receptacle is sealed, so as to effectually prevent the access of gases to the filtering material.

Figure 1:
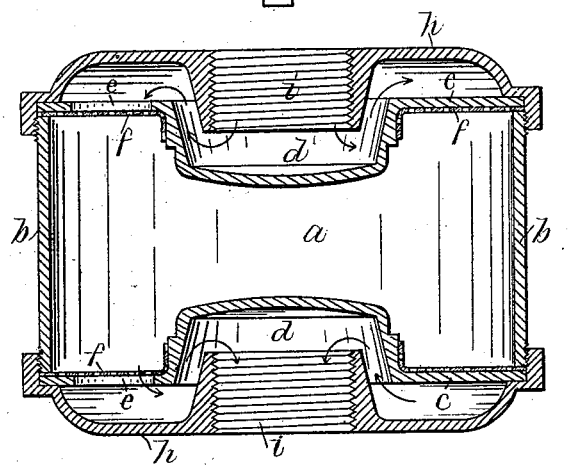
Figure 2:
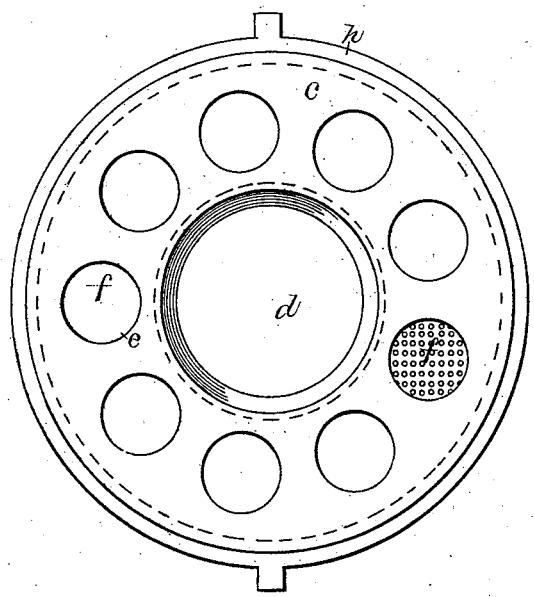

Figure 1 is a longitudinal section of a filter embodying this invention, and Fig. 2 a plan view thereof with one of the bonnets removed.

The charcoal or filtering material is contained in a receptacle, $a$, consisting of a cylindrical shell, $b$, provided at either end with heads $c$, each having a hollow or cavity, $d$, at its middle and a series of openings, $e$, disposed around the said cavity near the periphery of the said heads. The openings $e$ are covered by a foraminous plate, $f$, which prevents the filtering material from escaping from the receptacle $a$, and also serves as a strainer for the liquid to be filtered. The receptacle $a$ is provided with bonnets $h$, shown as screwed upon the cylinder $b$, the said bonnets having central hubs, $i$, adapted to be connected with the usual pipes or faucets from which the liquid to be filtered is drawn. The said hubs $i$ extend into the cavities $d$ of the heads $c$ beyond the level of the openings $e$.

In operation the filter is attached by the hub $i$ at either end to the pipe or faucet from which the liquid to be filtered is drawn, the said hubs being open and internally threaded for attachment to the faucet, and the openings of the hubs constituting the inlet and outlet passages of the filter. The liquid in entering passes into the cavity $d$, from which it spreads on all sides into the chamber formed between the bonnet $h$ and head $c$, as shown by the arrows, after which it passes through the openings $e$ and filtering material in the receptacle $a$ very slowly, owing to the large aggregate area of the openings in comparison with the size of the passage $i$. The liquid is thus exposed to a large amount of filtering material, through which it passes slowly and without cutting channels therein. The liquid at the lower end of the filter will always remain as high as the upper end of the passage $i$, which, in connection with the cavity $d$, thus forms a trap, preventing the entrance of gases into the receptacle $a$.

After the filter has been used for some time in one position it may be removed from the pipe or faucet and inverted. The liquid, on flowing through after such reversal of position of the filter, will clean the plate $f$ then at the lower end of the filter of the sedimentary material previously strained from the liquid by it.

The heads $c$ and bonnets $h$ may be struck up from sheet metal, thus making a very light and inexpensive filter.

I claim—

1. The receptacle for filtering material, having heads each provided with a series of openings near its periphery and with a central cavity to receive, check, and spread outward the incoming liquid, whereby the same is distributed throughout the body of the filtering material and caused to pass slowly through it, substantially as and for the purpose described.

2. The receptacle for filtering material, having heads provided with cavities and a series of openings around the said cavities, combined with the bonnets connected with the said receptacle, each bonnet being provided with an open hub entering the cavity of the adjacent head, whereby a trap is formed, substantially as and for the purpose set forth.

3. In a filter, a receptacle for filtering material, and a head provided with a cavity and located below the said filtering material, combined with a bonnet having its open central hub extended upward into the said cavity to form a trap to exclude air and gas from entering the filtering material from the discharging-orifice thereof in the said bonnet, substantially as shown and described.

In testimony whereof I have signed my name to this specification in the presence of two subscribing witnesses.

EDGAR K. HAYNES.

Witnesses:
JOS. P. LIVERMORE,
W. H. SIGSTON.